United States Patent
Sung et al.

(10) Patent No.: US 8,197,220 B2
(45) Date of Patent: Jun. 12, 2012

(54) DRIVING CONTROL APPARATUS AND METHOD FOR LINEAR COMPRESSOR

(75) Inventors: Ji-Won Sung, Seoul (KR); Jae-Yoo Yoo, Gyeonggi-Do (KR); Kyung-Bum Heo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 899 days.

(21) Appl. No.: 12/297,423

(22) PCT Filed: Apr. 18, 2007

(86) PCT No.: PCT/KR2007/001882
§ 371 (c)(1),
(2), (4) Date: Oct. 16, 2008

(87) PCT Pub. No.: WO2007/123323
PCT Pub. Date: Nov. 1, 2007

(65) Prior Publication Data
US 2009/0097987 A1 Apr. 16, 2009

(30) Foreign Application Priority Data
Apr. 20, 2006 (KR) ........................ 10-2006-0035884

(51) Int. Cl.
*F04B 49/06* (2006.01)

(52) U.S. Cl. ................. 417/44.11; 318/400.14

(58) Field of Classification Search .......... 417/44.1, 417/44.11, 417; 318/40.14, 400.17
See application file for complete search history.

(56) References Cited

U.S. PATENT DOCUMENTS

| 4,538,964 A | 9/1985 | Brown |
| 4,613,285 A | 9/1986 | Sato et al. |
| 5,342,176 A | 8/1994 | Redlich |
| 6,753,665 B2* | 6/2004 | Ueda et al. ........... 318/135 |
| 2003/0026702 A1* | 2/2003 | Yoo et al. ........... 417/44.11 |

* cited by examiner

*Primary Examiner* — Toan Ton
*Assistant Examiner* — Andrew Coughlin
(74) *Attorney, Agent, or Firm* — Birch, Stewart, Kolasch & Birch, LLP

(57) ABSTRACT

An apparatus for controlling an operation of a reciprocating compressor, includes: a control unit for detecting a current pushed amount of a piston when a TDC is detected as an inflection point of a phase difference between stroke and current, comparing the current pushed amount with a pushed amount reference value, and applying a DC voltage applied to a linear motor based on the comparison result. An AC voltage and a DC voltage are applied to the linear motor to increase the stroke, and when the TDC is detected, the current pushed amount is calculated and compared with the pushed amount reference value, and then, the DC voltage or a DC current applied to the linear motor is varied based on the comparison result, thereby obtaining a maximum compression volume without collision of the piston.

17 Claims, 4 Drawing Sheets

DRIVING CONTROL APPARATUS AND METHOD FOR LINEAR COMPRESSOR

BACKGROUND OF THE INVENTION

1. Field of the Invention

The present invention relates to a compressor and, more particularly, to an apparatus and method for controlling an operation of a reciprocating compressor.

2. Description of the Related Art

In general, a reciprocating compressor is operated to suck, compress and discharge a refrigerant gas by reciprocally and linearly moving a piston in a cylinder provided therein.

The reciprocating compressor is divided into a compressor using a recipro method and a compressor using a linear method according to how the piston is driven.

In the compressor using the recipro method, a crank shaft is coupled with a rotary motor and the piston is coupled with the crank shaft in order to change a rotating force of the rotary motor to a reciprocating motion.

In the compressor using the linear method, the piston connected with an actuator of a linear motor is linearly moved.

The reciprocating compressor using the linear method does not have such a crank shaft for changing the rotational motion into the linear motion, causing no frictional loss by the crank shaft, so it has high compression efficiency compared with a general compressor.

The reciprocating compressor can be employed for a refrigerator or an air-conditioner to control cooling capacity of the refrigerator or the air-conditioner by varying a compression ratio of the reciprocating compressor which can be varied by changing voltage inputted the motor of the reciprocating compressor.

Thus, when the reciprocating compressor is employed for the refrigerator or the air-conditioner, the cooling capacity can be controlled by varying the compression ratio of the reciprocating compressor by varying a stroke voltage inputted to the reciprocating compressor. Herein, the stroke refers to a distance between a top dead center and a bottom dead center of the piston.

The reciprocating compressor according to the related art will now be described with reference to FIG. 1.

FIG. 1 is a schematic block diagram showing the construction of an apparatus for controlling an operation of the reciprocating compressor.

As shown in FIG. 1, the related art apparatus for controlling an operation of the reciprocating compressor includes: a current detection unit 4 for detecting current applied to a motor (not shown) of a reciprocating compressor 6; a voltage detection unit 3 for detecting voltage applied to the motor; a stroke calculation unit 5 for calculating a stroke estimate value of the reciprocating compressor 6 based on the detected current and voltage values and a parameter of the motor; a comparing unit 1 for comparing the calculated stroke estimate value with a pre-set stroke reference value and outputting a difference value according to the comparison result; and a stroke control unit 2 for controlling an operation (stroke) of the compressor 6 by varying the voltage applied to the motor by controlling a turn-on period of a triac (not shown) connected in series to the motor according to the difference value.

The operation of the apparatus for controlling an operation of the reciprocating compressor will now be described with reference to FIG. 1.

First, the current detect unit 4 detects current applied to the motor (not shown) of the compressor 6 and outputs the detected current value to the stroke calculation unit 5.

At this time, the voltage detection unit 3 detects voltage applied to the motor and outputs the detected voltage value to the stroke calculation unit 5.

The stroke calculation unit 5 calculates a stroke estimate value (X) of the compressor by substituting the detected current and voltages values and the parameter of the motor to equation (1) shown below and applies the calculated stroke estimate value (X) to the comparing unit 1:

$$X = \frac{1}{\alpha}\int (V_M - Ri - L\bar{i})dt \tag{1}$$

wherein 'R' is a motor resistance value, 'L' is a motor inductance value, $\alpha$ is a motor constant, $V_M$ is a voltage value applied to the motor, 'i' is a current value applied to the motor, and $\bar{i}$ is a time change rate of the current applied to the motor. Namely, $\bar{i}$ is a differential value (di/dt) of 'i'.

Thereafter, the comparing unit 1 compares the stroke estimate value and the stroke reference value and applies a difference value according to the comparison result to the stroke control unit 2.

The stroke control unit 2 controls stroke of the compressor 6 by varying the voltage applied to the motor of the compressor 6 based on the difference value.

This operation will now be described with reference to FIG. 2.

FIG. 2 is a flow chart illustrating the processes of a method for controlling an operation of the reciprocating compressor according to the related art.

First, when the stroke estimate value is applied to the comparing unit 1 by the stroke calculation unit 5 (step S1), the comparing unit 1 compares the stroke estimate value and a pre-set stroke reference value (step S2) and outputs a difference value according to the comparison result to the stroke control unit 2.

When the stroke estimate value is smaller than the stroke reference value, the stroke control unit 2 increases the voltage applied to motor to control the stroke of the compressor (step S3), and when the stroke estimate value is greater than the stroke reference value, the stroke control unit 2 reduces the voltage applied to the motor (step S4).

When the voltage applied to the motor is increased or reduced, the triac (not shown) electrically connected with the motor control the turn-on period and applies the voltage to the motor.

The stroke reference value differs depending on a size of a load of the reciprocating compressor. Namely, when the load is large, the stroke reference value is increased not to reduce the stroke of the piston and prevent degradation of cooling capacity. Conversely, when the load is small, the stroke reference value is reduced not to increase the stroke of the piston and prevent an increase of the cooling capacity and generation of collision of the piston and the cylinder due to an excessive stroke (over-stroke).

FIG. 3 is a flow chart illustrating the processes of controlling a top dead center (TDC) of the related art reciprocating compressor. The stroke control unit 2 increases an input current and checks whether a present stroke is TDC=0. If the present stroke is TDC=0, the stroke control unit 2 maintains the present input current as it is.

If the present stroke is not TDC=0, the stroke control unit 2 checks whether the stroke is lower than TDC=0.

If the stroke is lower than TDC=0, the stroke control unit 2 keeps increasing the input current, and if the stroke is higher than TDC=0, the stroke control unit 2 reduces the input current.

Herein, the TDC refers to a position of a piston when a compression stroke of the piston is completed.

A bottom dead center (BDC) is a position of the piston when a suction stroke of the piston is completed.

Efficiency of the reciprocating compressor is maximized at a position where TDC is 0, so when controlling an operation of the reciprocating compressor, the piston is controlled to come to the position where TDC is 0.

In this case, the reciprocating compressor requires particular load conditions, namely, a maximum compression volume.

However, when a gas spring constant is small, the reciprocating compressor cannot be operated with the maximum stroke without collision of the piston because a pushed amount of the piston is small. That is, the reciprocating compressor cannot be operated at the maximum compression volume.

BRIEF DESCRIPTION OF THE INVENTION

Therefore, an object of the present invention is to provide an apparatus and method for controlling an operation of a reciprocating compressor by which stroke is increased by applying an AC voltage and a DC voltage to a linear motor, and when a top dead center (TDC) is detected, a current pushed amount is calculated and compared with a pushed amount reference value, and the DC voltage or a DC current applied to the linear motor is varied based on the comparison result to thereby obtain a maximum compression volume stably without collision of a piston.

To achieve these and other advantages and in accordance with the purpose of the present invention, as embodied and broadly described herein, there is provided an apparatus for controlling an operation of a reciprocating compressor, including: a control unit for detecting a current pushed amount of a piston when a TDC is detected as an inflection point of a phase difference between stroke and current, comparing the current pushed amount with a pushed amount reference value, and applying a DC voltage applied to a linear motor based on the comparison result.

To achieve the above object, there is provided an apparatus for controlling an operation of a reciprocating compressor including: a control unit for detecting a current pushed amount of a piston when a TDC is detected as an inflection point of a phase difference between stroke and current, comparing the current pushed amount with a pushed amount reference value, and outputting a control signal for varying a DC voltage applied to a linear motor based on the comparison result and a stroke control signal for varying the stroke; a first comparing unit for comparing a DC voltage reference voltage and a currently inputted DC voltage according to the control signal and outputting a DC voltage correction signal based on the comparison result; a pulse width modulation (PWM) control unit for outputting a PWM control signal for varying the DC voltage; and an inverter for varying the DC voltage applied to the linear motor according to the PWM control signal.

To achieve the above object, there is provided a method for controlling an operation of a reciprocating compressor including: increasing stroke by increasing a voltage obtained by adding an AC voltage and a DC voltage applied to a linear motor according to a size of a load; detecting a top dead center (TDC) by using current applied to the linear motor and a current stroke; when the TDC is detected, maintaining the current AC voltage applied to the linear motor; detecting a current stroke and calculating a pushed amount by using the detected stroke; and comparing the pushed amount with a pushed amount reference value and varying the DC voltage applied to the linear motor based on the comparison result.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

An apparatus and method for controlling an operation of a reciprocating compressor by which stroke is increased by applying an AC voltage and a DC voltage to a linear motor, and when a top dead center (TDC) is detected, a current pushed amount is calculated and compared with a pushed amount reference value, and the DC voltage or a DC current applied to the linear motor is varied based on the comparison result to thereby obtain a maximum compression volume stably without collision of a piston, according to preferred embodiments of the present invention will now be described.

Figure 1:
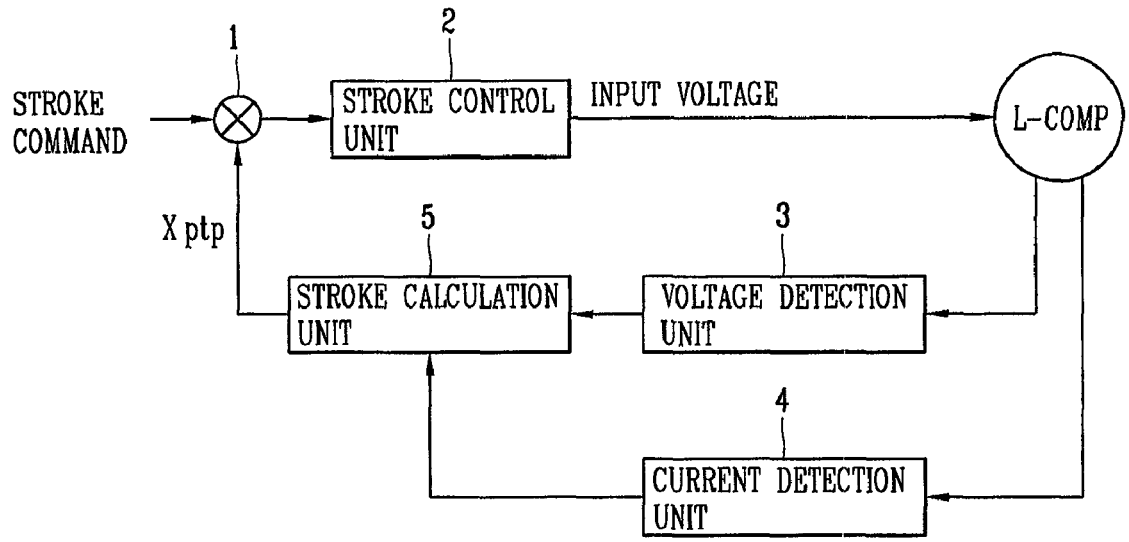
FIG. 1 is a schematic block diagram showing the construction of an apparatus for controlling an operation of a reciprocating compressor according to the related art.
Figure 2:
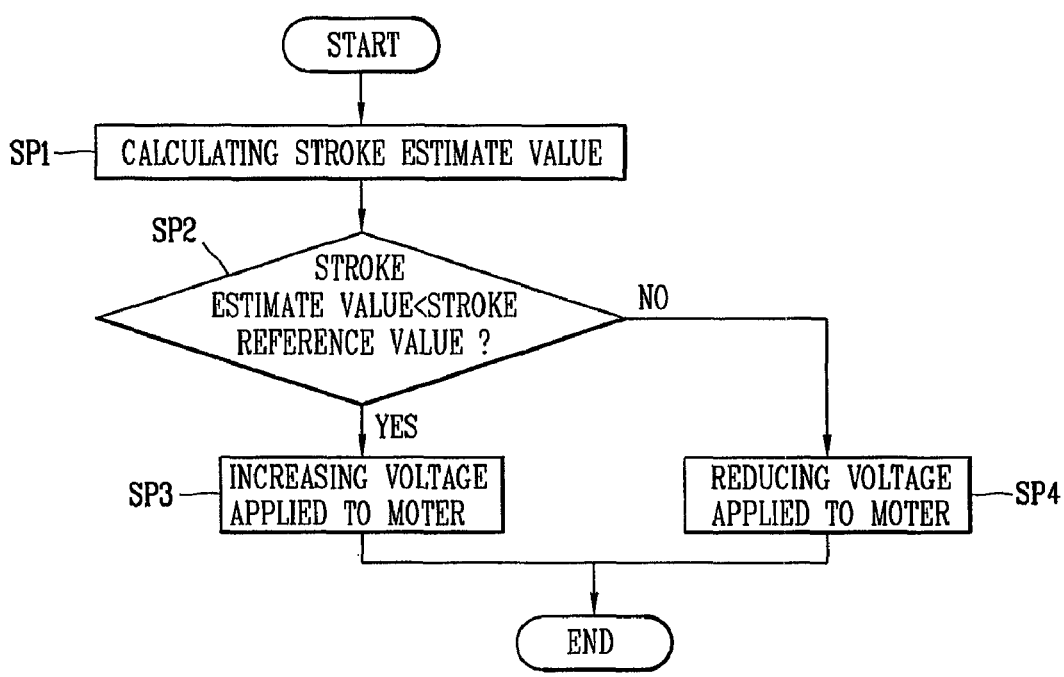
FIG. 2 is a flow chart illustrating the processes of a method for controlling an operation of the reciprocating compressor according to the related art.
Figure 3:
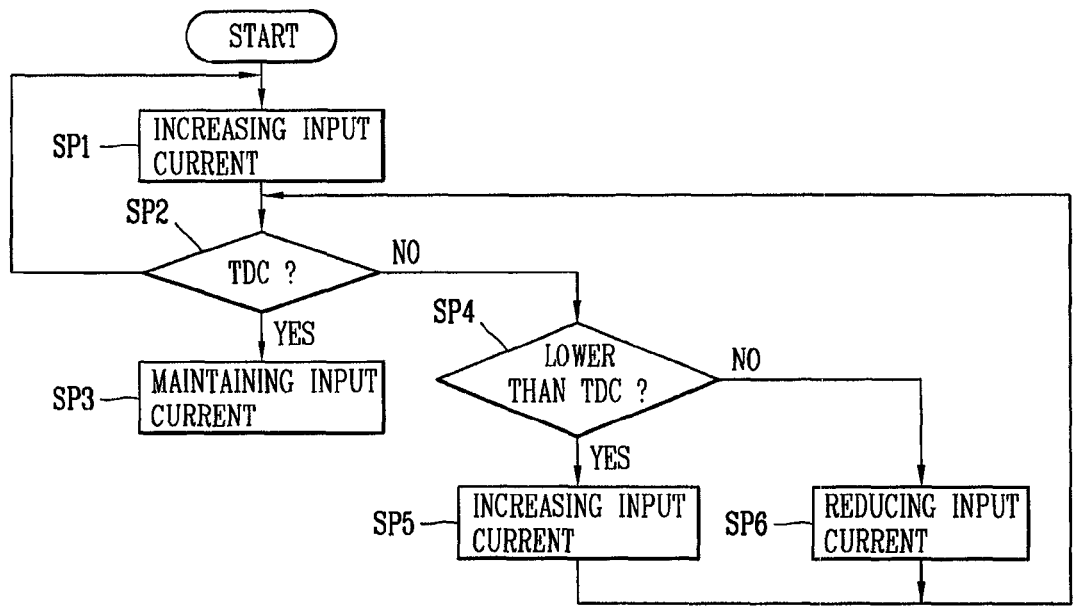
FIG. 3 is a flow chart illustrating the processes of controlling a TDC of the reciprocating compressor according to the related art.
Figure 4:
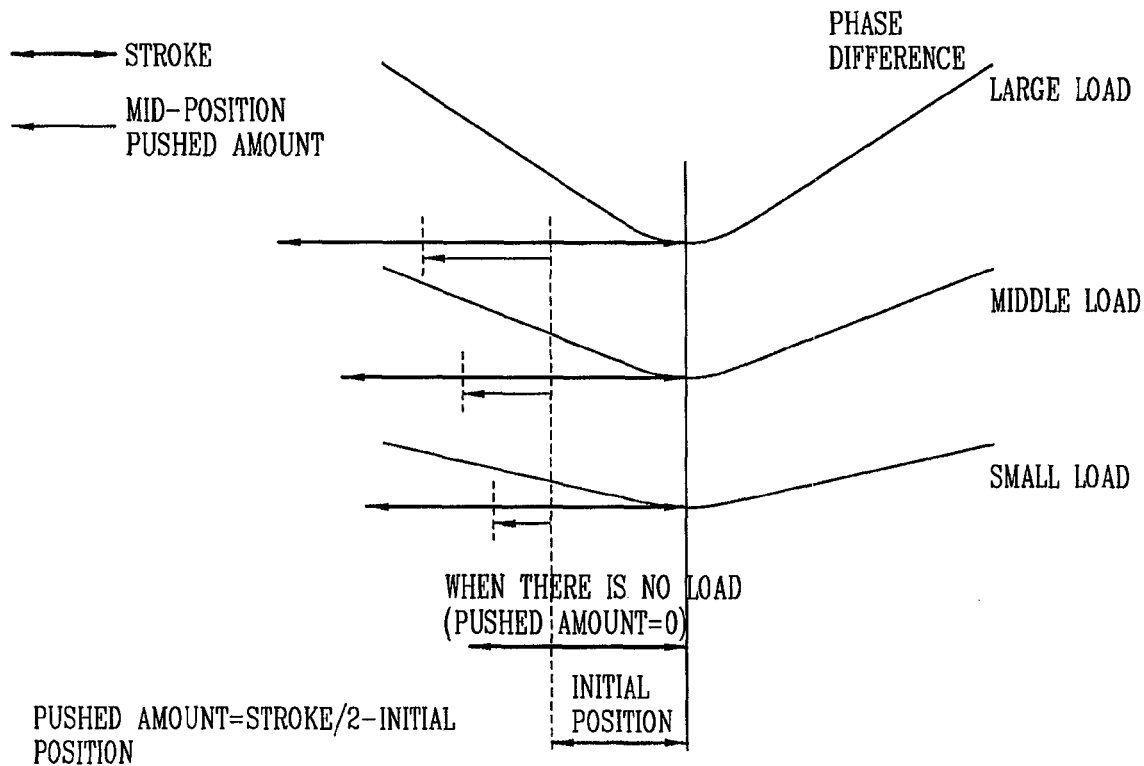
FIG. 4 is a view showing a relationship of a load and a pushed amount in the reciprocating compressor.

In the apparatus and method for controlling an operation of a reciprocating compressor, the present invention considers that, as shown in FIG. 4, because a pushed amount increases in proportion to a size of a load, a maximum compression volume can be obtained without collision of a piston by compensating the pushed amount with a DC voltage or a DC current.

Figure 5:
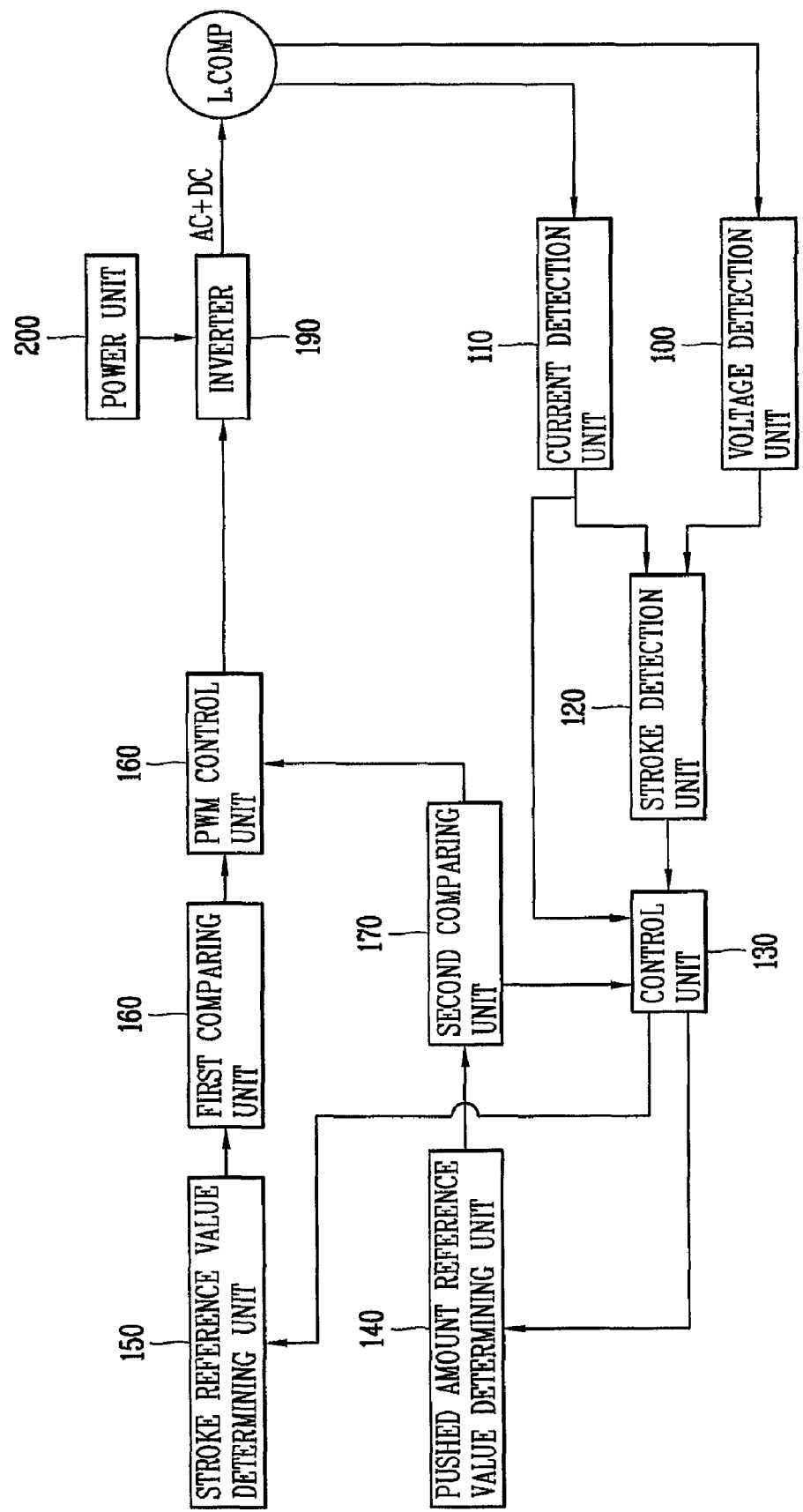
FIG. 5 is a schematic block diagram showing the construction of an apparatus for controlling an operation of a reciprocating compressor according to the present invention.

FIG. 5 is a schematic block diagram showing the construction of an apparatus for controlling an operation of a reciprocating compressor according to the present invention.

As shown in FIG. 5, the apparatus for controlling an operation of a reciprocating compressor includes a voltage detection unit 100, a current detection unit 110, a stroke detection unit 120, a control unit 130, first and second comparing units 160 and 170, a pushed amount reference value determining unit 140, a stroke reference value determining unit 150, a pulsed width modulation (PWM) control unit 180, an inverter 190 and a power unit 200.

The current detection unit 110 detects current of a motor of the reciprocating compressor and the voltage detection unit 100 detects voltage applied to the reciprocating compressor.

The stroke detection unit 120 calculates stroke by using the detected current and detected voltage.

When a TDC is detected as an inflection point of a phase difference between stroke and current, the control unit 130 detects a current pushed amount of the piston, compares the pushed amount with a pushed amount reference value, and varies a DC voltage applied to the linear motor based on the comparison result.

Namely, when the current pushed amount is the same as the pushed amount reference value, the control unit 130 maintains the DC voltage applied to the linear motor as it is, when the current pushed amount is smaller than the pushed amount reference value, the control unit 130 increases the DC voltage applied to the linear motor, and when the current pushed amount is greater than the pushed amount reference value, the control unit 130 reduces the DC voltage applied to the linear motor.

In this case, the control unit 130 can detect the pushed amount by equation shown below:

Pushed amount=stroke/2−initial position of piston wherein the initial position of the piston is an initial position when it was designed without a load.

Alternatively, the control unit can detect the TDC according to various methods. Namely, the control unit can detect the TDC by detecting an inflection point of a damping coefficient used in a mechanical equation of the reciprocating compressor, or by detecting an inflection point of a gas spring constant.

In addition, the control unit 130 outputs a stroke control signal for varying a stroke reference value and a pushed amount control signal for varying a pushed amount reference value according to a load.

The stroke reference value determining unit 150 determines the stroke reference value according to the stroke control signal.

The pushed amount reference value determining unit 150 determines the pushed amount reference value according to the pushed amount control signal.

In this case, the control unit includes a storage unit (not shown) for previously determining and storing a pushed amount reference value of each load according to experimentation, and whenever the load is varied, the control unit controls to select a pushed amount reference value corresponding to the corresponding load.

The first comparing unit 160 compares the stroke reference value and the current stroke and outputs a stroke correction signal based on the comparison result.

The second comparing unit 170 compares the pushed amount reference value and a pushed amount and outputs a pushed amount correction signal based on the comparison result.

The PWM control unit 180 outputs a PWM control signal for varying the DC voltage or the DC current applied to the linear motor, and outputs a PWM control signal for varying the stroke according to the stroke correction signal.

Herein, the PWM control signal includes a PWM duty rate varying signal and a PWM period varying signal. The DC current or the DC voltage applied to the linear motor is varied according to the PWM duty rate varying signal.

When the pushed amount reference value is smaller than the detected pushed amount, the PWM duty rate is increased, and when the pushed amount reference value is greater than the detected pushed amount, the PWM duty rate is reduced.

The inverter 190 varies the DC voltage or the DC current applied to the linear motor according to the PWM control signal, and varies an AC voltage or an AC current applied to the linear motor.

Namely, an ON/OFF time of a switching element of the inverter 190 is controlled by the PWM control signal, and an input current (AC current+DC current) or an input voltage (AC voltage+DC voltage) outputted from the power unit 200 is varied and applied to the linear motor.

Herein, the power unit 200 generates a uniform DC voltage by rectifying and smoothing general AC power.

Figure 6:
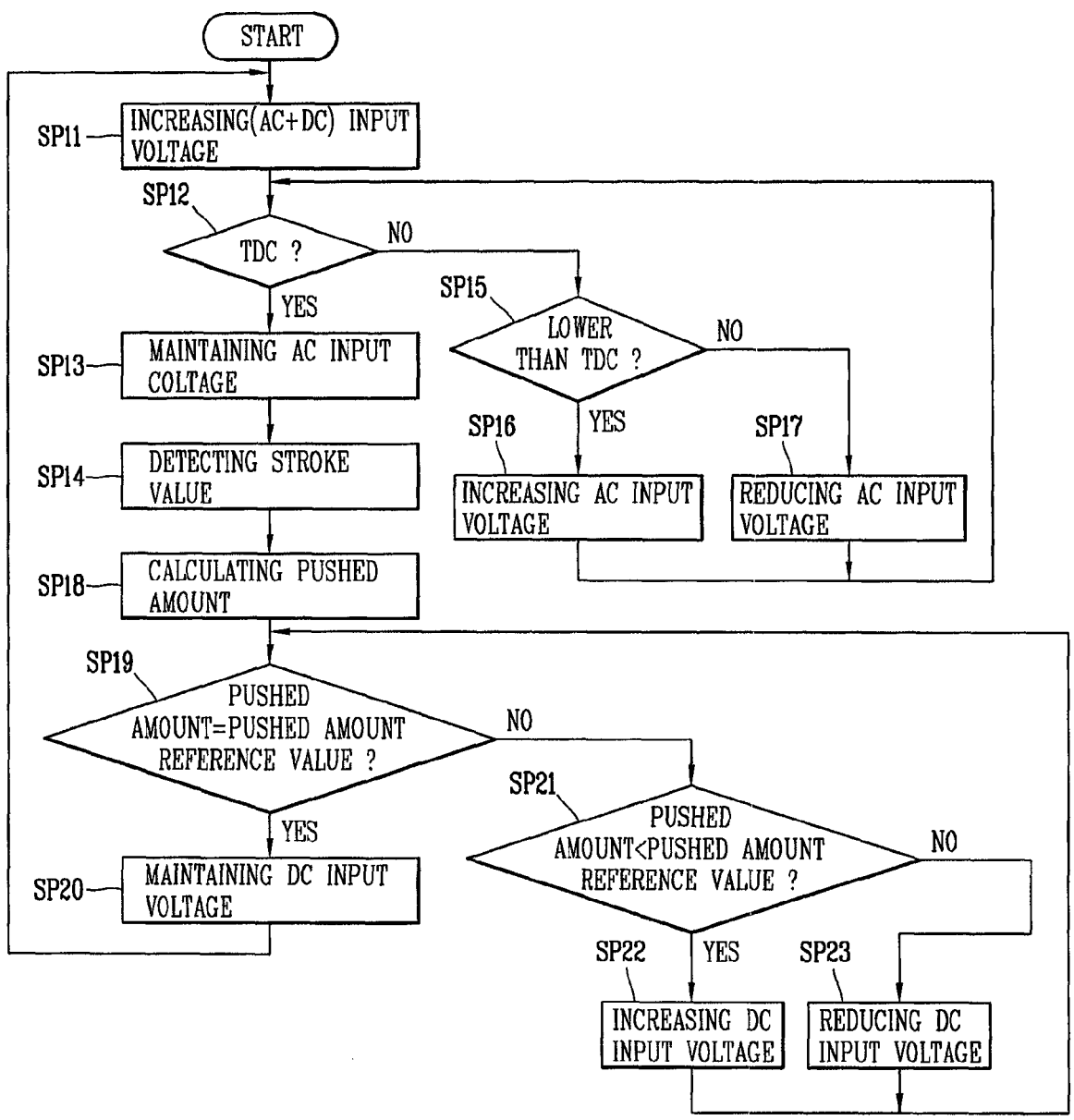
FIG. 6 is a flow chart illustrating the processes of a method for controlling an operation of the reciprocating compressor.

The operation of the present invention will now be described with reference to FIG. 6.

First, it is assumed that voltage obtained by the DC voltage to the AC voltage is applied to the linear motor to vary the stroke.

In this state, the current detection unit 110 detects an AC current applied to the motor of the reciprocating compressor, and the voltage detection unit 100 detects an AC voltage of the motor of reciprocating compressor.

Next, the stroke detection unit 120 calculates a stroke by using the detected AC current and the detected AC voltage.

Herein, in the present invention, the control unit 130 increases the stroke by controlling the AC voltage and the DC voltage applied to the linear motor (SP11), detects a TDC as an inflection point of a phase difference between the stroke and the AC current (SP12), and varies the AC voltage applied to the linear motor based on the TDC detection result.

Herein, the TDC physically refers to a stroke when a compression stroke of the piston is completed.

Because efficiency of the reciprocating compressor is the best at the position where the TDC is 0 (TDC=0), when the operation of the reciprocating compressor is controlled such that the piston is positioned at the point where the TDC=0. In the present invention, the point where TDC=0 is referred to as TDC.

Namely, the control unit 130 increases the stroke by increasing the AC voltage and the DC voltage applied to the linear motor according to the load (SP11).

For example, the control unit 130 outputs the stroke control signal for varying the stroke and the pushed amount control signal according to the load.

Accordingly, the stroke reference value determining unit 150 determines the stroke reference value according to the stroke control signal and the pushed amount reference value determining unit 140 determines the pushed amount reference value according to the pushed amount control signal.

Thereafter, the first comparing unit 160 compares the stroke reference value and the current stroke and outputs the stroke correction signal based on the comparison result, and the second comparing unit 170 compares the pushed amount reference value and the pushed amount and outputs the pushed amount correction signal based on the comparison result.

Accordingly, the PWM control unit 180 outputs the PWM control signal based on the stroke correction signal and the pushed amount correction signal, and the inverter 230 varies the AC voltage and the DC voltage applied to the linear motor according to the PWM control signal (SP11).

And then, the control unit 130 checks whether the current stroke is the TDC (SP12). When the current stroke is not the same as the TDC, the control unit 130 checks whether the stroke is lower than the TDC (SP15). When the current stroke is lower than the TDC, the control unit 130 keeps increasing the AC voltage currently inputted to the linear motor.

If the current stroke is higher than the TDC, the control unit 130 reduces the AC voltage currently inputted to the linear motor.

If the current stroke is equal to the TDC, the control unit 130 maintains the AC voltage applied to the linear motor as it is (SP13), detects the stroke (SP14), calculates the pushed amount (SP18), and checks whether the calculated pushed amount is the same as the pushed amount reference value (SP19).

When the pushed amount is the same as the pushed amount reference value, the control unit 130 maintains the DC voltage applied to the linear motor as it is (SP20). When the pushed amount is not the same as the pushed amount reference value, the control unit 130 checks whether the pushed amount is smaller than the pushed amount reference value (SP21).

When the pushed amount is smaller than the pushed amount reference value, the control unit 130 increases the DC voltage currently inputted to the linear motor (SP22), and when the pushed amount is greater than the pushed amount reference value, the control unit 130 reduces the DC voltage currently inputted to the linear motor (SP23).

Namely, in the reciprocating compressor, the AC voltage and the DC voltage is applied to the linear motor to increase the stroke, and when the TDC is detected, the current pushed amount is calculated and compared with the pushed amount reference value, and then, the DC voltage applied to the linear motor is varied based on the comparison result, thereby obtaining the maximum compression volume.

Or, in the different embodiment, in the reciprocating compressor, the AC current or the DC current is applied to the linear motor to increase the stroke, and when the TDC is detected, the current pushed amount is calculated and compared with the pushed amount reference value, and the DC current applied to the linear motor is varied based on the comparison result, thereby obtaining the maximum compression volume.

As so far described, the apparatus and method for controlling the operation of the reciprocating compressor according to the present invention have the following advantages.

That is, the AC voltage and the DC voltage or the AC current or the DC current are applied to the linear motor to increase the stroke, and when the TDC is detected, the current pushed amount is calculated and the DC voltage or the DC current applied to the linear motor is varied by using the calculated pushed amount. Thus, the maximum compression volume can be stably obtained without collision of the piston.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for controlling an operation of a reciprocating compressor, comprising:
a control unit configured to detect a current pushed amount of a piston when a top dead center (TDC) is detected as an inflection point of a phase difference between stroke and current, comparing the current pushed amount with a pushed amount reference value, and applying a DC voltage applied to a linear motor based on the comparison result,
wherein the control unit detects a pushed amount according to an equation shown below:

Pushed amount=stroke/2−initial position of the piston, and wherein the initial position of the piston is an initial position when it was designed without a load,
the control unit further configured to output a stroke control signal for varying a stroke reference value and a pushed amount control signal for varying the pushed amount reference value according to a load.

2. The apparatus of claim 1, wherein when the current pushed amount is the same as the pushed amount reference value, the control unit maintains the DC voltage applied to the linear motor as it is.

3. The apparatus of claim 1, wherein when the current pushed amount is smaller than the pushed amount reference value, the control unit increases the DC voltage applied to the linear motor.

4. The apparatus of claim 1, wherein when the current pushed amount is greater than the pushed amount reference value, the control unit reduces the DC voltage applied to the linear motor.

5. An apparatus for controlling an operation of a reciprocating compressor comprising:
a control unit configured to detect a current pushed amount of a piston when a TDC is detected as an inflection point of a phase difference between stroke and current, comparing the current pushed amount with a pushed amount reference value, and outputting a control signal for varying a DC voltage applied to a linear motor based on the comparison result and a stroke control signal for varying the stroke;
a first comparing unit for comparing a DC voltage reference voltage and a currently inputted DC voltage according to the control signal and outputting a DC voltage correction signal based on the comparison result;
a pulse width modulation (PWM) control unit for outputting a PWM control signal for varying the DC voltage; and
an inverter for varying the DC voltage applied to the linear motor according to the PWM control signal,
wherein the control unit detects a pushed amount according to an equation shown below:

Pushed amount=stroke/2−initial position of the piston, wherein the initial position of the piston is an initial position when it was designed without a load, and
wherein the PWM control unit outputs the PWM control signal based on a stroke correction signal and a pushed amount correction signal.

6. The apparatus of claim 5, wherein when the current pushed amount is the same as the pushed amount reference value, the control unit maintains the DC voltage applied to the linear motor as it is.

7. The apparatus of claim 5, wherein when the current pushed amount is smaller than the pushed amount reference value, the control unit increases the DC voltage applied to the linear motor.

8. The apparatus of claim 5, wherein when the current pushed amount is greater than the pushed amount reference value, the control unit reduces the DC voltage applied to the linear motor.

9. The apparatus of claim 5, wherein the control unit outputs the stroke control signal for varying a stroke reference value and a pushed amount control signal for varying the pushed amount reference value according to a size of a load.

10. The apparatus of claim 5, further comprising:
a stroke reference value determining unit for determining a stroke reference value according to the stroke control signal; and
a pushed amount reference value determining unit for determining the pushed amount reference value according to the load.

11. The apparatus of claim 5, further comprising:
a second comparing unit for comparing a stroke reference value and a current stroke and outputting the stroke correction signal based on the comparison result.

12. The apparatus of claim 5, wherein the PWM control unit outputs the PWM control signal for varying the stroke according to the stroke correction signal.

13. A method for controlling an operation of a reciprocating compressor comprising:
increasing stroke by increasing a voltage obtained by adding an AC voltage and a DC voltage applied to a linear motor according to a size of a load;
detecting a top dead center (TDC) by using current applied to the linear motor and a current stroke;
when the TDC is detected, maintaining a current AC voltage applied to the linear motor;
detecting a current stroke and calculating a pushed amount by using the detected stroke;
comparing the current stroke with a stroke reference value and comparing the pushed amount with a pushed amount reference value and varying the DC voltage applied to the linear motor based on the comparison results,
wherein the calculating of the pushed amount comprises calculating the pushed amount according to an equation shown below:

$$\text{Pushed amount} = \text{stroke}/2 - \text{initial position of the piston},$$

and
wherein the initial position of the piston is an initial position when it was designed without a load.

14. The method of claim 13, wherein the varying of the DC voltage comprises:
when the current pushed amount is the same as the pushed amount reference value, maintaining the DC voltage applied to the linear motor as it is.

15. The method of claim 13, wherein the varying of the DC voltage comprises:
when the current pushed amount is smaller than the pushed amount reference value, increasing the DC voltage applied to the linear motor.

16. The method of claim 13, wherein the varying of the DC voltage comprises:
when the current pushed amount is greater than the pushed amount reference value, reducing the DC voltage applied to the linear motor.

17. The method of claim 13, further comprising:
setting the stroke reference value and the pushed amount reference value according to a size of a load.

* * * * *